(12) United States Patent
Ni et al.

(10) Patent No.: US 12,442,506 B2
(45) Date of Patent: Oct. 14, 2025

(54) LIGHT GUIDE FOR A LIGHTING DEVICE OF A MOTOR VEHICLE, LIGHTING DEVICE AND MOTOR VEHICLE

(71) Applicant: VALEO VISION, Bobigny (FR)

(72) Inventors: Zebin Ni, Foshan (CN);
Xingang-steven Shi, Foshan (CN);
Kunyi Lin, Foshan (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/725,173

(22) PCT Filed: Dec. 21, 2022

(86) PCT No.: PCT/EP2022/087257
§ 371 (c)(1),
(2) Date: Jun. 28, 2024

(87) PCT Pub. No.: WO2023/126276
PCT Pub. Date: Jul. 6, 2023

(65) Prior Publication Data
US 2025/0109833 A1    Apr. 3, 2025

(30) Foreign Application Priority Data
Dec. 30, 2021    (CN) .................. 202123383993.X

(51) Int. Cl.
*F21S 43/20*    (2018.01)
*F21S 43/14*    (2018.01)
(Continued)

(52) U.S. Cl.
CPC ......... *F21S 43/26231* (2024.05); *F21S 43/14* (2018.01); *F21S 43/31* (2018.01); *F21S 43/40* (2018.01); *F21Y 2115/10* (2016.08)

(58) Field of Classification Search
CPC ...... F21S 43/26231; F21S 43/40; F21S 43/14; F21S 43/31
See application file for complete search history.

(56) References Cited

U.S. PATENT DOCUMENTS 6,305,813 B1 * 10/2001 Lekson ................. F21S 43/245
362/625
9,458,986 B2   10/2016 Kono
(Continued)

FOREIGN PATENT DOCUMENTS

DE    102006008191 A1    8/2007
DE    102017128841 A1    6/2019
(Continued)

OTHER PUBLICATIONS

European Patent Office, International Search Report and Written Opinion of corresponding International Application No. PCT/EP2022/087257, dated Mar. 28, 2023.
(Continued)

*Primary Examiner* — Bryon T Gyllstrom
(74) *Attorney, Agent, or Firm* — Valeo Vision

(57) ABSTRACT

The present application relates to a collimator, the collimator including a light incident surface configured to allow a light ray from a light source to enter the collimator through the light incident surface and a light emitting surface configured to emit a light ray that enters the collimator through the light incident surface and is collimated by the collimator. The collimator also includes a light distribution portion. The present application further relates to a lighting device and a motor vehicle.

7 Claims, 6 Drawing Sheets

(51) Int. Cl.
*F21S 43/31* (2018.01)
*F21S 43/40* (2018.01)
*F21Y 115/10* (2016.01)

(56) References Cited

U.S. PATENT DOCUMENTS

| | | | |
|---|---|---|---|
| 10,288,248 B1* | 5/2019 | Crespin | F21S 41/141 |
| 10,962,194 B1* | 3/2021 | Hemon | F21S 41/24 |
| 11,248,771 B2 | 2/2022 | Wolak-Gorczyca et al. | |
| 2002/0071267 A1* | 6/2002 | Lekson | F21S 43/249 |
| | | | 362/23.17 |
| 2004/0196667 A1* | 10/2004 | Lea | G02B 6/0046 |
| | | | 362/555 |
| 2005/0152141 A1* | 7/2005 | Suzuki | B60Q 1/0058 |
| | | | 362/241 |
| 2006/0164839 A1* | 7/2006 | Stefanov | F21S 43/237 |
| | | | 362/327 |
| 2008/0002427 A1* | 1/2008 | Kropac | G02B 6/0038 |
| | | | 362/606 |
| 2010/0246200 A1* | 9/2010 | Tessnow | F21S 43/243 |
| | | | 362/509 |
| 2014/0146554 A1* | 5/2014 | Giraud | F21S 43/239 |
| | | | 362/311.12 |
| 2017/0241615 A1* | 8/2017 | Luo | G02B 6/0068 |
| 2021/0102681 A1* | 4/2021 | Sato | F21S 43/14 |
| 2023/0008568 A1* | 1/2023 | Shah | F21S 43/14 |

FOREIGN PATENT DOCUMENTS

| | | |
|---|---|---|
| DE | 202021100910 U1 | 3/2021 |
| EP | 3492807 A1 | 6/2019 |
| EP | 3599418 A1 | 1/2020 |
| JP | 2012028156 A | 2/2012 |
| JP | 2015185304 A | 10/2015 |
| JP | 2020205147 A | 12/2020 |

OTHER PUBLICATIONS

Japan Patent Office, Office Action (with English translation) of corresponding Japanese Patent Application No. 2024-539676, dated Jun. 16, 2025, 14 pages.

Japan Patent Office, Search Report (with English translation) of corresponding Japanese Patent Application No. 2024-539676, dated Jun. 16, 2025, 27 pages.

* cited by examiner

LIGHT GUIDE FOR A LIGHTING DEVICE OF A MOTOR VEHICLE, LIGHTING DEVICE AND MOTOR VEHICLE

TECHNICAL FIELD

The present invention relates to the technical field of automotive lighting, in particular to a collimator, a lighting device and a motor vehicle.

BACKGROUND OF THE INVENTION

In car lighting, an optical element is usually used to modulate light emitted from a light source to form emitting light with a desired light distribution or pattern, and the outgoing light is guided or emitted in a target direction by a light emitting surface to fulfil a lighting or signal indication function. It is difficult to ensure a homogeneous lighting effect when the light emitting surface is large and the optical element is provided with only one light incident surface or a light inlet.

With a conventional design, a light ray region is provided in the light emitting surface in which only a large angle is used, and since weak light and energy are needed to illuminate a large area in this region, the brightness of this region is lower than that of another region, or even fails to meet the requirements of regulations. In the middle region of the light incident surface of the collimator, compared with the two sides, a small-angle light ray can meet the light emitting angle without being fully reflected after being refracted once in this region, and thus the middle region of the light emitting surface often has the highest brightness.

SUMMARY OF THE INVENTION

Therefore, an objective of the present application is to provide a collimator capable of at least partially solving the technical problems mentioned above.

A collimator according to the present application is provided, comprising: a light incident surface, configured to allow a light ray from a light source to enter the collimator through the light incident surface; a light emitting surface, configured to emit a light ray that enters the collimator through the light incident surface and is collimated by the collimator; the collimator further comprises a light distribution portion.

According to a non-limiting embodiment of the present application, the light distribution portion comprises a first reflecting surface and a second reflecting surface, wherein the first reflecting surface is configured to reflect a light ray entering the collimator through the light incident surface to the second reflecting surface.

In a non-limiting embodiment according to the present application, the first reflecting surface is a fully reflecting surface with a stepped structure.

In a non-limiting embodiment according to the present application, the second reflecting surface comprises a light modulation region, the light modulation region being configured to redistribute the emitting angle of a light ray entering the light modulation region.

In a non-limiting embodiment according to the present application, the light modulation region comprises a pillow-shaped optical surface with an angle of inclination relative to the main plane of the second reflecting surface.

In a non-limiting embodiment according to the present application, the light emitting surface comprises different light emitting regions, which respectively emit light rays from different light modulation regions.

In a non-limiting embodiment according to the present application, the collimator further comprises a first side and a second side, the first side being provided with a first auxiliary reflecting surface and a second auxiliary reflecting surface, wherein the first auxiliary reflecting surface and the second auxiliary reflecting surface are respectively configured to receive and reflect light rays from different light modulation regions.

In a non-limiting embodiment according to the present application, the light incident surface has the shape of an arc.

The present application further provides a lighting device, which comprises a collimator according to any of these embodiments.

The present application further provides a motor vehicle, comprising the aforementioned lighting device.

By adopting the above-described technical solution, a collimator of the present application has the following beneficial effects: a collimator of the present application has a uniform lighting effect on the whole, and a uniform lighting effect may be guaranteed even when the light emitting surface has a large width to enable saving of the space for the collimator, which allows the lamp to have a more compact structure.

BRIEF DESCRIPTION OF THE DRAWINGS

The present application will be further described below in conjunction with the drawings, wherein.

DETAILED DESCRIPTION OF THE INVENTION

Figure 1:
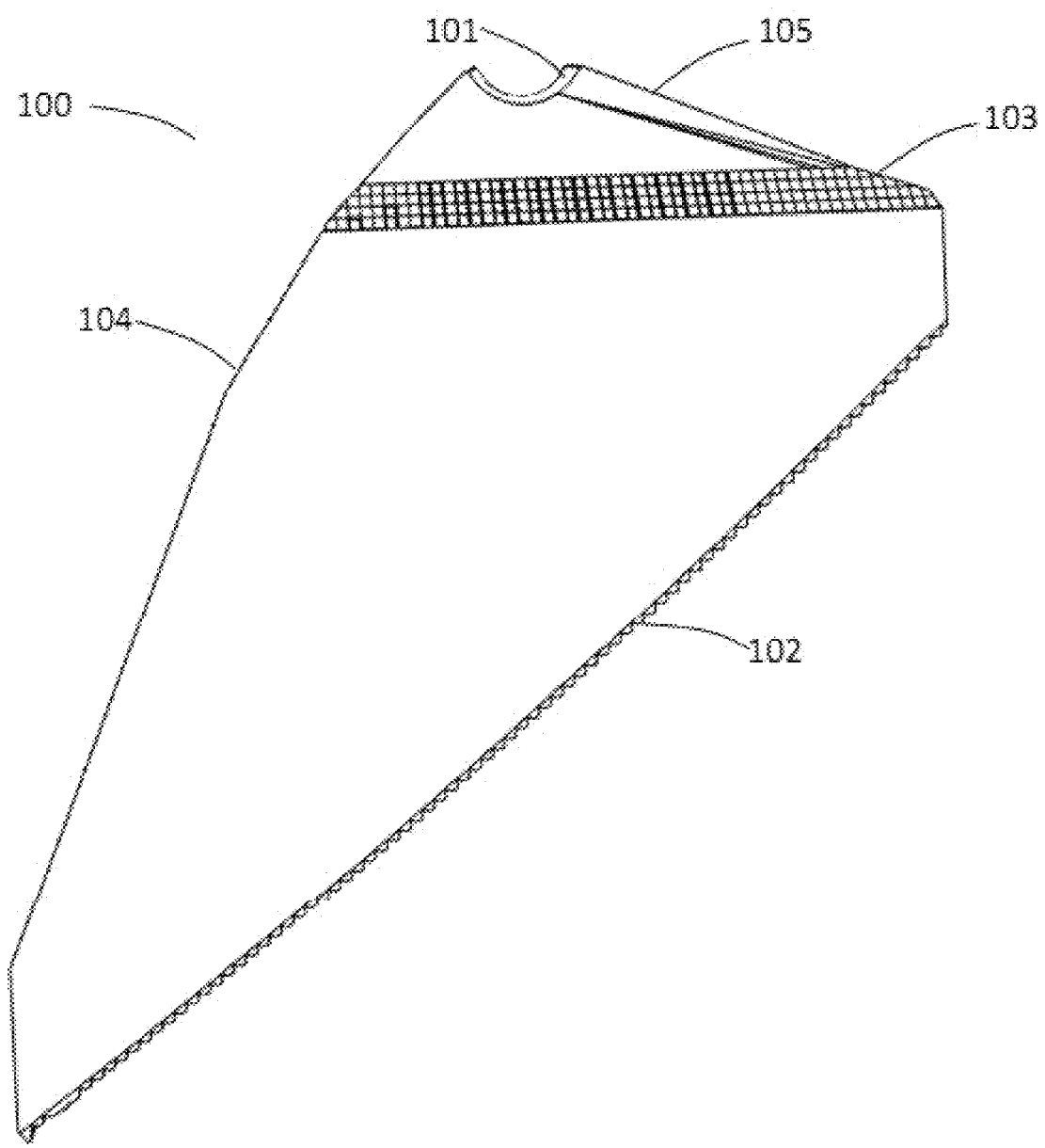
FIG. 1 is a front view of a collimator according to the present application.

Embodiments of the present application are exemplified below. As those skilled in the art should realize, the embodiments described may be modified in various ways without departing from the concept of the present application. Thus, the accompanying drawings and the description are in essence demonstrative and non-limiting. In the following text, identical reference symbols generally indicate functionally identical or similar elements.

It should be understood that while terms like "first", "second", "third", etc. may be used in the present application to describe various items of information, such items of information should not be limited to these terms. These terms are only used to differentiate items of information of the same type. For example, without departing from the scope of the present application, a first item of information may also be called a second item of information, and, similarly, a second item of information may also be called a first item of information. Depending on the context, the word "if" as used herein may be interpreted as "when . . . " or "at the time of . . . " or "in response to determination".

It should be noted that in the description of the present application, orientations or positional relationships indicated by terms such as "longitudinal", "transverse", "upper", "lower", "front", "rear", "left", "right", "vertical", "horizontal", "top", "bottom", "inner", "outer", etc., are usually based on the orientations or positional relationships shown in the drawings, are only intended for convenience of describing the present application and brevity of description, instead of indicating or implying that the device or element referred to must have a specific orientation or be constructed and operated in a specific orientation, and therefore should not be understood as a limitation of the scope of protection of the present application.

Figure 2:
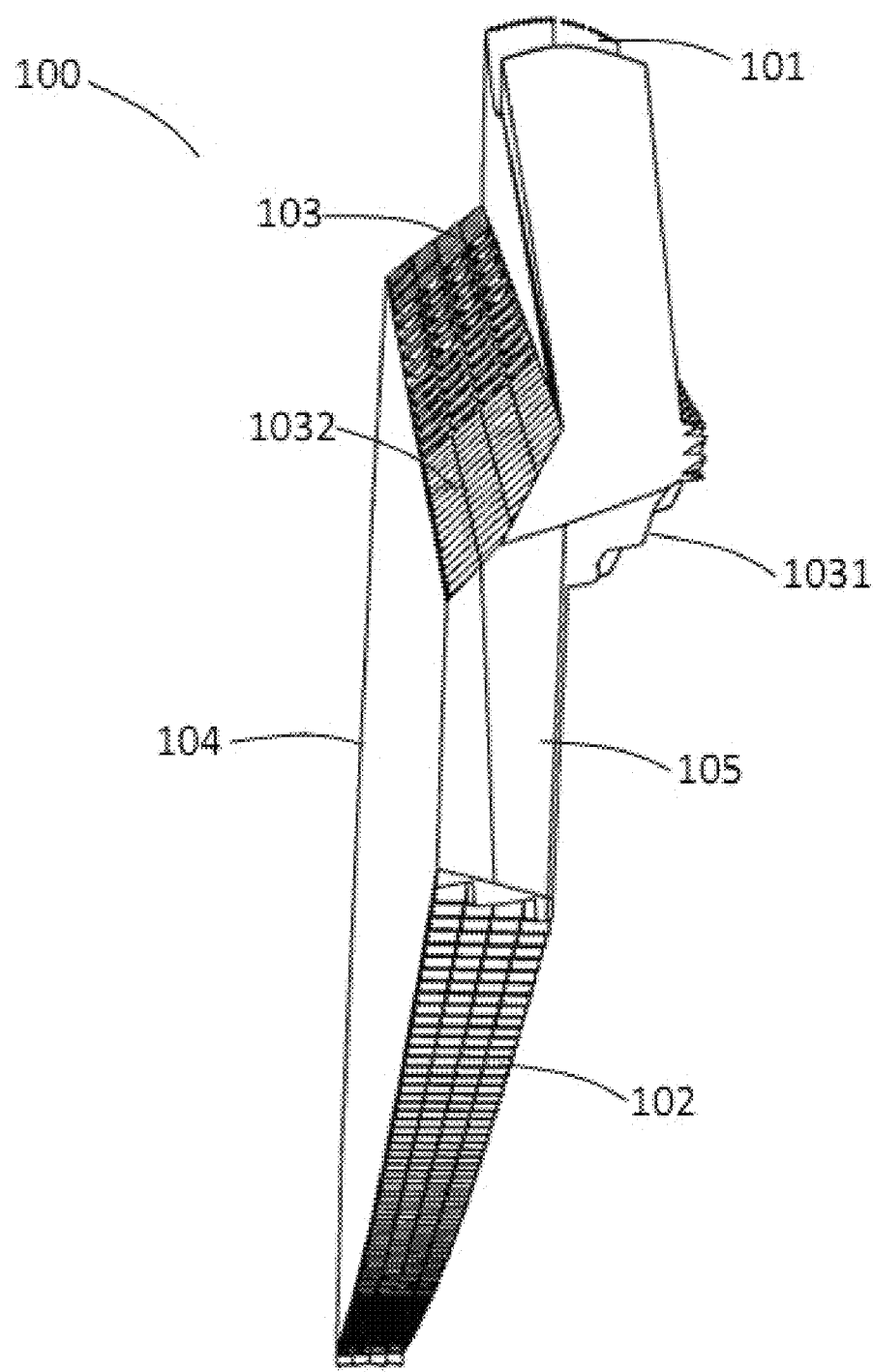
FIG. 2 is a front view of a collimator according to the present application.

FIG. 1 and FIG. 2 are respectively a front view and a side view of the collimator 100 of the present application. The collimator 100 comprises a light incident surface 101, configured to allow a light ray from a light source to enter the collimator 100 through the light incident surface 101; a light emitting surface 102, configured to emit a light ray that enters the collimator 100 through the light incident surface 101 and is collimated by the collimator.

In order for the light emitting surface to produce a uniform lighting effect, it is necessary to ensure that the energy of the light ray at the light emitting surface is evenly distributed, and therefore the present application provides a light distribution portion 103 to redistribute light ray distribution. As shown in FIG. 2, the light distribution portion 103 is a stepped structure on the collimator 100.

In one example, the light distribution portion 103 comprises a first reflecting surface 1031 and a second reflecting surface 1032. Preferably, both the first reflecting surface 1031 and the second reflecting surface 1032 are fully reflecting surfaces. A light ray entering the collimator 100 via the light incident surface 101 is fully reflected twice at the first reflecting surface 1031 and the second reflecting surface 1032 to generate substantially parallel beams at the light emitting surface 102 and achieve a substantially uniform light distribution at the light emitting surface 102.

Figure 4:
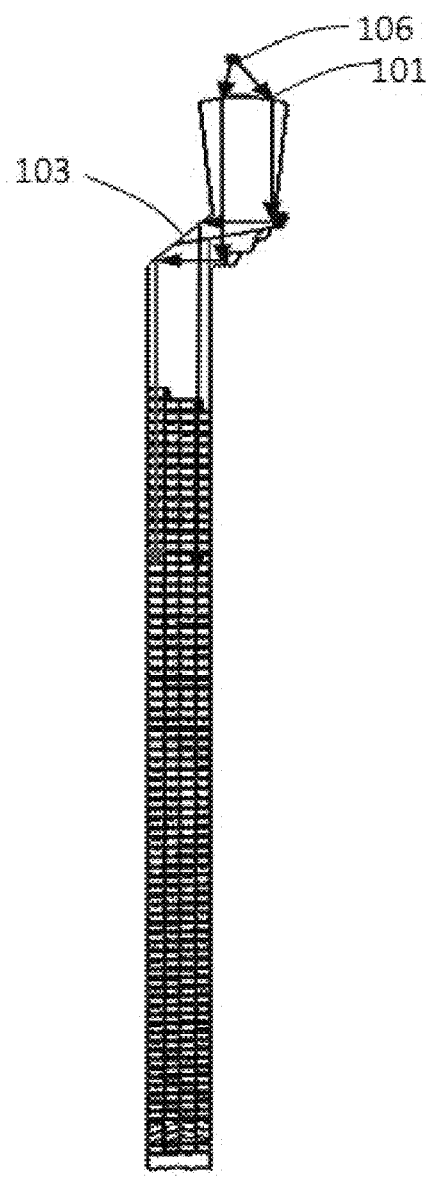
FIG. 4 is an optical path diagram of a collimator at the light distribution structure according to the present application.

It is clear from FIG. 2 that the first reflecting surface 1031 is a fully reflecting surface with a stepped structure, which is configured to reflect a light ray entering the collimator 100 through the light incident surface 101 to the second reflecting surface 1032. The first reflecting surface 1031 receives all the light rays entering the collimator 100 via the light incident surface 101, and reflects the light rays to the second reflecting surface 1032. Redistribution and orientation are then achieved via the second reflecting surface 1032. FIG. 4 is an optical path diagram of a collimator according to the present application at the light distribution structure.

Figure 3:
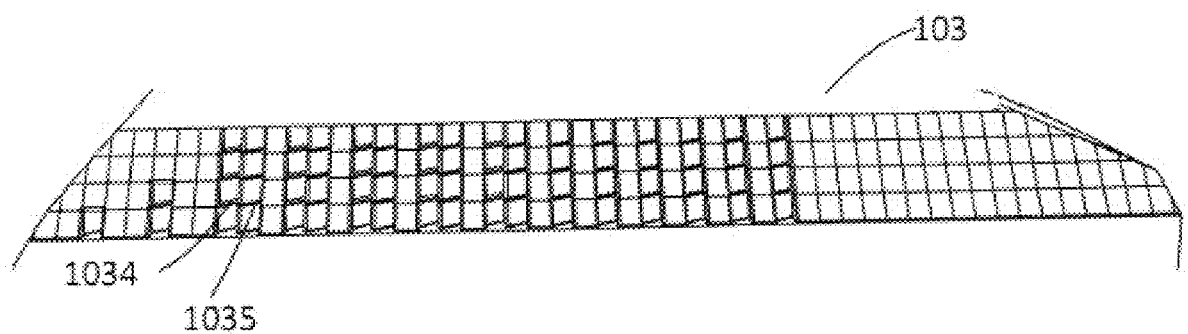
FIG. 3 is a schematic diagram of a light distribution structure according to the present application.
Figure 5:
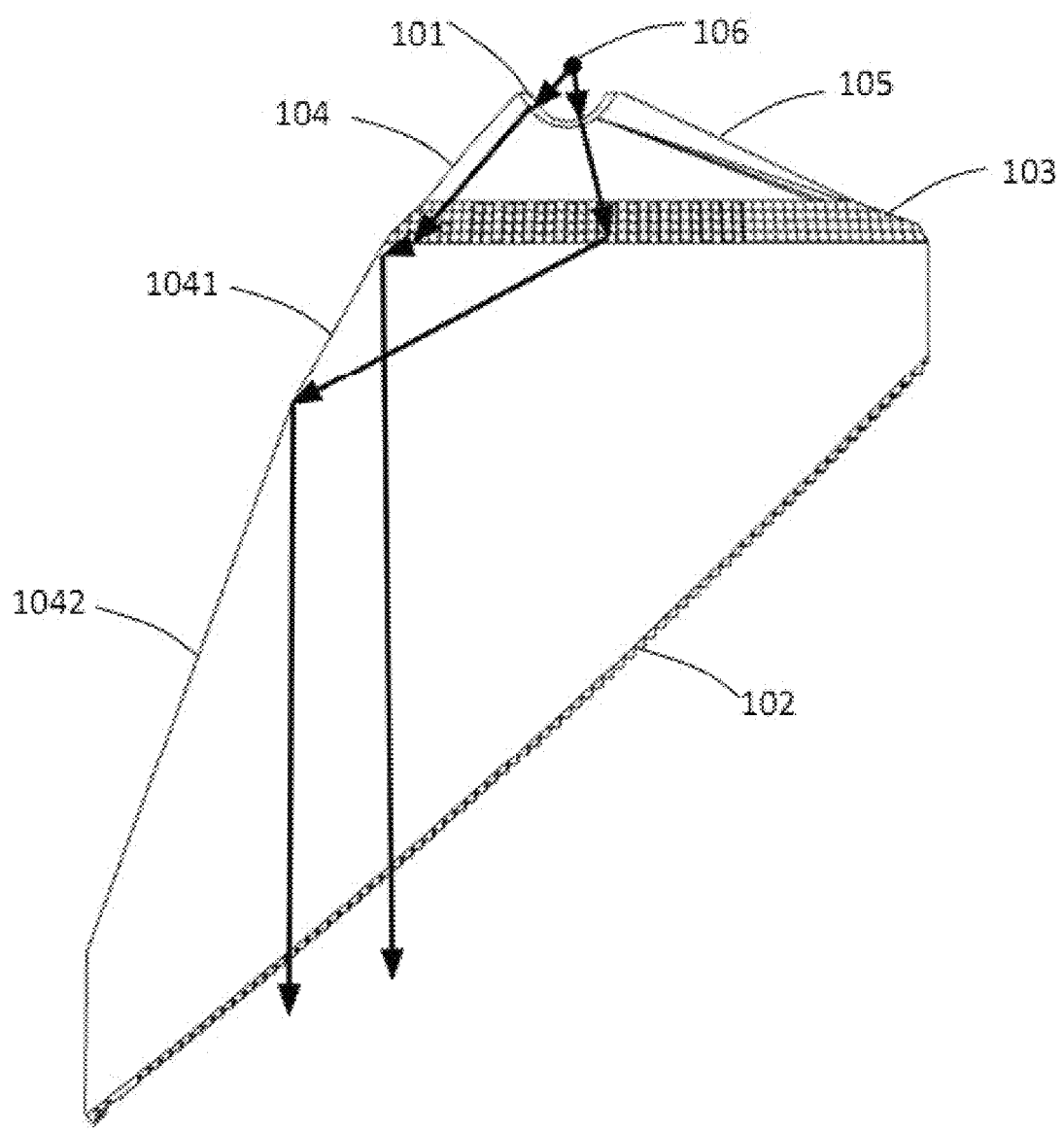
FIG. 5 is optical path diagram I of a collimator according to the present application at the second reflecting surface.
Figure 6:
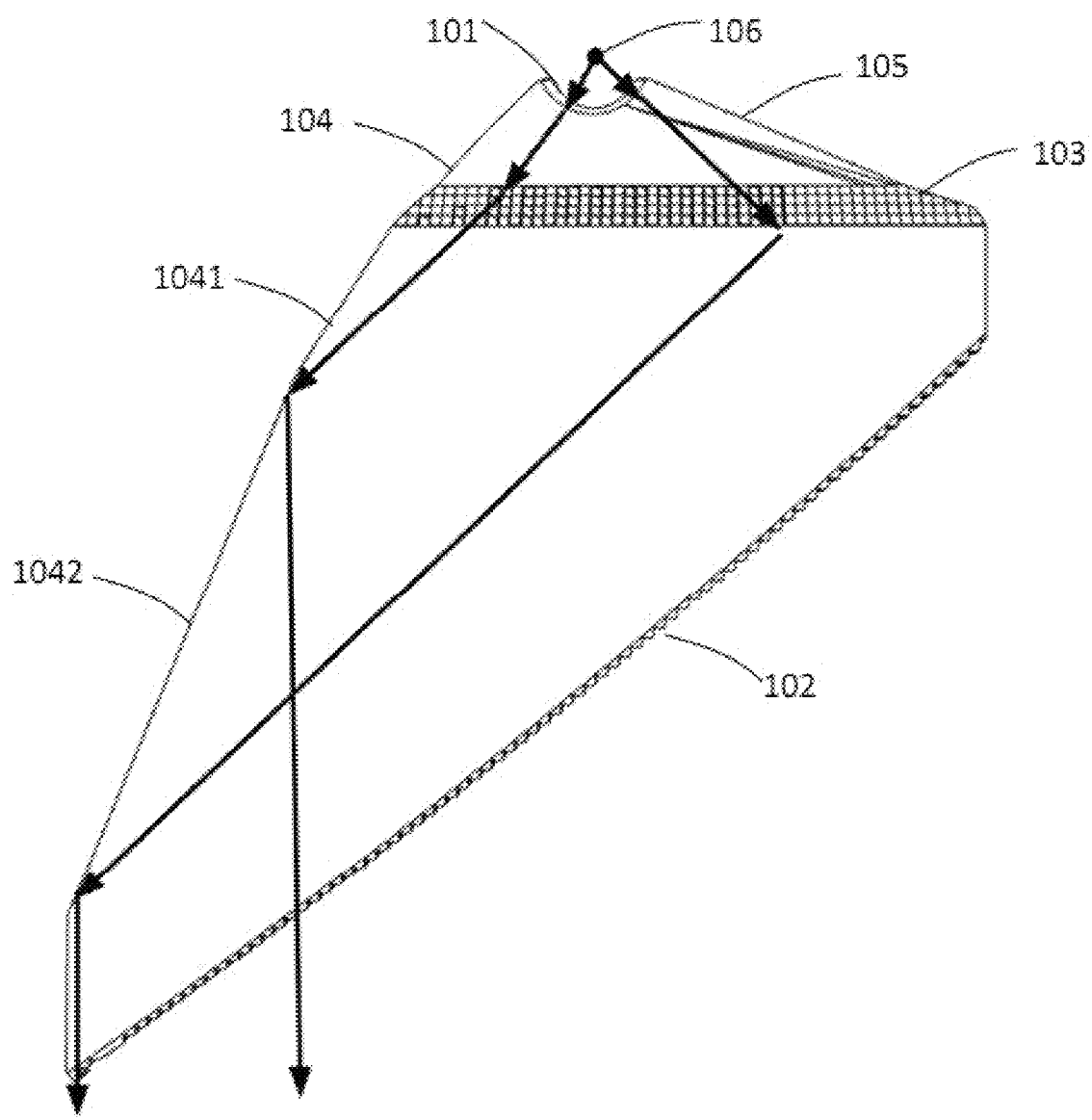
FIG. 6 is optical path diagram I of a collimator according to the present application at the second reflecting surface.
Figure 7:
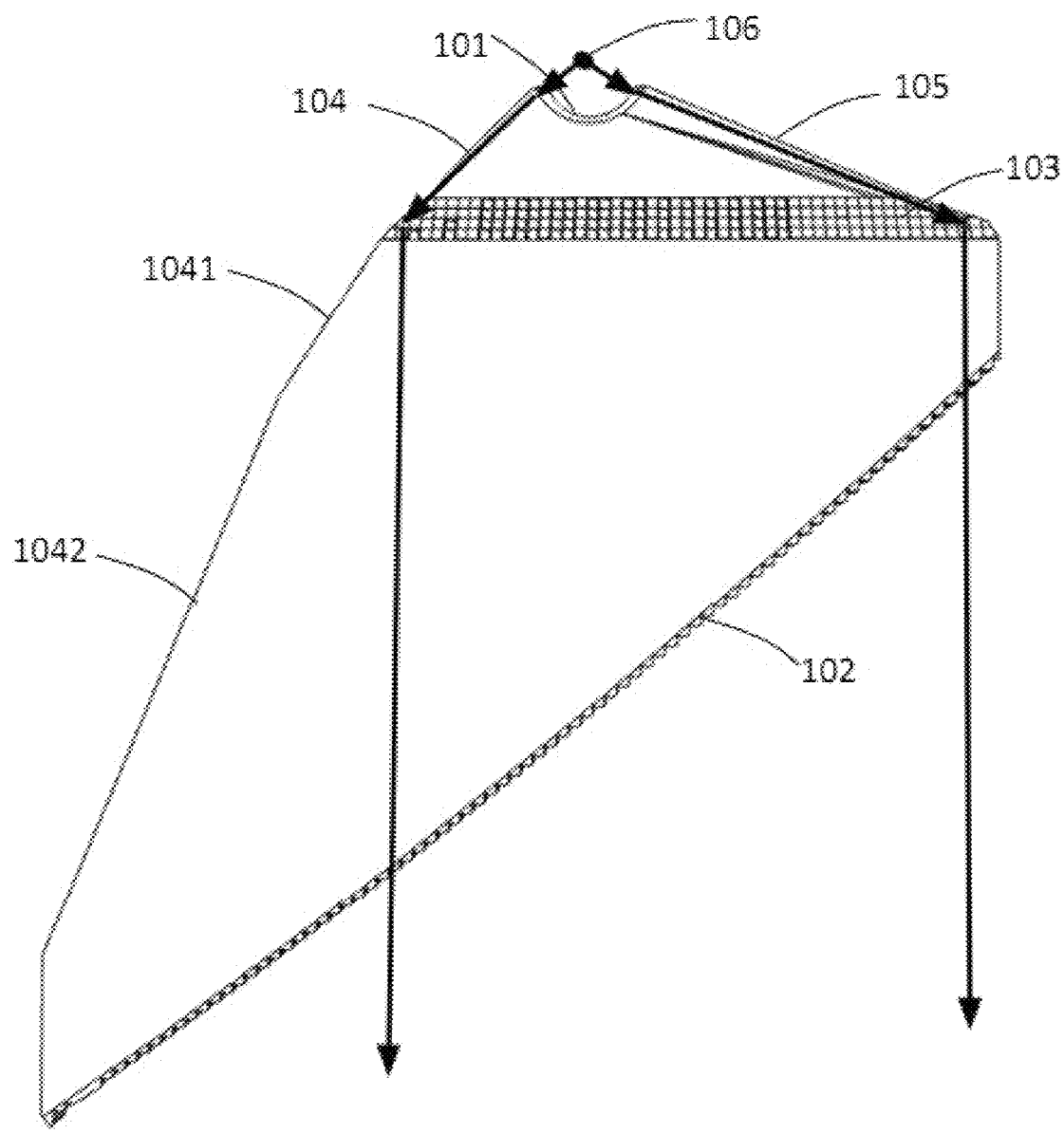
FIG. 7 is optical path diagram I of a collimator according to the present application at the second reflecting surface.

In one example, as shown in FIG. 3, the second reflecting surface 1032 more specifically comprises light modulation regions 1034 and 1035, which redistribute the emitting angle of a light ray entering the light modulation region. The light modulation regions 1034 and 1035 comprise pillow-shaped optical surfaces with different angles of inclination relative to the main plane of the second reflecting surface 1032. FIGS. 5-7 are corresponding optical path diagrams at the second reflecting surface. As shown in FIGS. 5-7, the light modulation regions 1034 and 1035 redistribute and collimate light rays reflected into the light modulation regions via the first reflecting surface 1031.

The light emitting surface 102 comprises different light emitting regions (not shown), which respectively emit light rays from different light modulation regions 1034 and 1035.

Specifically, as shown in FIGS. 5-6, with a middle region of the light incident surface of the collimator, a small-angle light ray, after being reflected by the first reflecting surface 1031 in this region, reaches the second fully reflecting surface 1032, and, after the light ray is modulated by the light modulation regions of the second reflecting surface 1032, its direction of emission changes from the region substantially facing the light incident surface to the region near the left side of the collimator, so that the brightness of the middle region of the light emitting surface that originally has the highest brightness is slightly reduced compared with the original brightness. As shown in FIG. 7, for both sides of the light incident surface of the collimator, a large-angle light ray, after being reflected by the first reflecting surface 1031 in this region, reaches the second fully reflecting surface 1032, and after being reflected by the second reflecting surface 1032, reaches the light emitting surface. The large-angle light ray, together with the light rays modulated as shown in FIG. 5 and FIG. 6, can ensure that the light emitting region on the left side of the collimator has substantially the same brightness as the middle region after modulation.

After modulation by the light modulation regions 1034 and 1035 of the second reflecting surface 1032, the left light emitting region, which originally has a lower brightness, now has more energy distribution, and the middle light output region, which originally has a higher brightness, now has a reduced energy distribution, so that the light emitting surface 102 produces a uniform light output effect.

In the examples shown in FIG. 3 and FIGS. 5-7, the light modulation region comprises a pillow-shaped optical surface with two inclination angles. The setting mode, position and number of pillow-shaped optical surfaces in the light modulation regions 1034 and 1035 may be selected according to actual needs, specifically, according to the brightness of the light source, the collimator size, the size of the light emitting surface and other factors, which are not specifically restricted in the present application.

The collimator 100 further comprises a first side 104 and a second side 105. In one example, as shown in FIGS. 1-2, the length of the first side 104 is greater than that of the second side 105. When the sides have different lengths, the light homogenization effect produced by the design of the present application is more significant.

In one example, as shown in FIGS. 1-2, the first side 104 is provided with a first auxiliary reflecting surface 1041 and a second auxiliary reflecting surface 1042, wherein the first auxiliary reflecting surface 1041 and the second auxiliary reflecting surface 1042 are respectively configured to receive and reflect light rays from different light modulation regions. Auxiliary reflecting surfaces may be set to adjust the light emission angles of light rays, further ensuring nearly parallel emission of light rays. An auxiliary reflecting surface does not affect the energy distribution of light rays adjusted by the light distribution portion 103.

According to an example of the present application, the first side 104 and the second side 105 are preferably fully reflective surfaces, which can have substantially planar profiles.

In one example, the light incident surface 101 has the shape of an arc. The arc is preferably an arc recessed into the interior of the collimator 100. Compared with the light incident surface of a traditional collimator, the arc-shaped light incident surface 101 is more conducive to uniform output light distribution.

In addition, as shown in FIG. 1 and FIG. 2, the light emitting surface 102 has a dentate structure, which enables the light pattern to meet the regulatory requirements on lighting.

In a preferred example, the collimator 100 is integrally formed, preferably manufactured integrally by molding transparent plastic materials, such as PMMA or polycarbonate, to simplify the manufacturing process and reduce costs.

In an optional example, the light source 106 is preferably a light-emitting diode.

A collimator according to the present application is applicable to the lighting and signal indicating devices of motor vehicles, such as tail lights and signal lights.

A collimator of the present application has a uniform lighting effect as a whole and can ensure a uniform lighting effect even when the light emitting surface has a large width to enable saving of the space occupied by the collimator, which allows the lamp to have a more compact structure.

The present application further provides a lighting device comprising the collimator 100.

In addition, the present application further provides a motor vehicle, comprising the lighting device described above.

The lighting device or motor vehicle according to the present application at least has the beneficial effects brought by the collimator 100.

For those skilled in the art, it is clear that the present application is not limited to the details of the above exemplary embodiments, and the present application can be implemented in other specific forms without departing from the spirit or essential features of the present application. Thus, regardless of which viewpoint is taken, the embodiments should be regarded as being demonstrative and non-limiting; the scope of the present application is defined by the attached claims and not by the above description, hence it is intended that all changes falling within the meaning and scope of equivalent key elements of the claims be included in the present application. Any reference symbols in the claims shall not be construed as limiting the claims concerned.

What is claimed is:

1. A collimator, comprising:
   a light incident surface configured to allow a light ray from a light source to enter the collimator through the light incident surface;
   a light emitting surface configured to emit a light ray that enters the collimator through the light incident surface and is collimated by the collimator; and
   a light distribution portion
   wherein the light distribution portion includes a first reflecting surface and a second reflecting surface, wherein the first reflecting surface is configured to reflect a light ray passing through the light incident surface into the collimator to the second reflecting surface, with the second reflecting surface including light modulation regions, the light modulation regions being configured to redistribute the emitting angle of a light ray entering the light modulation region and include a pillow-shaped optical surface with an angle of inclination relative to the main plane of the second reflecting surface.

2. The collimator according to claim 1, wherein the first reflecting surface is a fully reflecting surface with a stepped structure.

3. The collimator according to claim 1, wherein the light emitting surface includes different light emitting regions, which respectively emit light rays from different light modulation regions.

4. The collimator according to claim 1, further comprising a first side and a second side, the first side being provided with a first auxiliary reflecting surface and a second auxiliary reflecting surface, wherein the first auxiliary reflecting surface and the second auxiliary reflecting surface are respectively configured to receive and reflect light rays from different light modulation regions.

5. The collimator according to claim 1, wherein the light incident surface has the shape of an arc.

6. A lighting device, comprising a collimator, with the collimator including:
   a light incident surface configured to allow a light ray from a light source to enter the collimator through the light incident surface;
   a light emitting surface configured to emit a light ray that enters the collimator through the light incident surface and is collimated by the collimator; and
   a light distribution portion, wherein the light distribution portion includes a first reflecting surface and a second reflecting surface, wherein the first reflecting surface is configured to reflect a light ray passing through the light incident surface into the collimator to the second reflecting surface, with the second reflecting surface including light modulation regions, the light modulation regions being configured to redistribute the emitting angle of a light ray entering the light modulation region and include a pillow-shaped optical surface with an angle of inclination relative to the main plane of the second reflecting surface.

7. A motor vehicle, comprising a lighting device, with the lighting device including a collimator that includes:
   a light incident surface configured to allow a light ray from a light source to enter the collimator through the light incident surface;
   a light emitting surface configured to emit a light ray that enters the collimator through the light incident surface and is collimated by the collimator; and
   a light distribution portion, wherein the light distribution portion includes a first reflecting surface and a second reflecting surface, wherein the first reflecting surface is configured to reflect a light ray passing through the light incident surface into the collimator to the second reflecting surface, with the second reflecting surface including light modulation regions, the light modulation regions being configured to redistribute the emitting angle of a light ray entering the light modulation region and include a pillow-shaped optical surface with an angle of inclination relative to the main plane of the second reflecting surface.

* * * * *